US008083563B2

(12) United States Patent
Liu et al.

(10) Patent No.: US 8,083,563 B2
(45) Date of Patent: Dec. 27, 2011

(54) METHODS OF FABRICATING DISPLAY PANEL AND FLEXIBLE COLOR FILTER THEREOF

(75) Inventors: Su-Cheng Liu, Hsinchu (TW); Ted-Hong Shinn, Hsinchu (TW); Yi-Ching Wang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 99 days.

(21) Appl. No.: 12/402,432

(22) Filed: Mar. 11, 2009

(65) Prior Publication Data

US 2010/0178832 A1 Jul. 15, 2010

(30) Foreign Application Priority Data

Jan. 9, 2009 (TW) ............................... 98100781 A

(51) Int. Cl.
*H01J 9/00* (2006.01)
*B29C 65/00* (2006.01)

(52) U.S. Cl. ............ 445/25; 445/24; 349/187; 349/190; 156/230; 156/235; 156/101

(58) Field of Classification Search .................... 445/24, 445/25; 349/187–189; 156/230, 235, 101
See application file for complete search history.

(56) References Cited

U.S. PATENT DOCUMENTS

| | | | | |
|---|---|---|---|---|
| 6,934,001 | B2 * | 8/2005 | Nishiki | 349/187 |
| 2001/0019382 | A1 * | 9/2001 | Song et al. | 349/106 |
| 2007/0247565 | A1 * | 10/2007 | Sasaki et al. | 349/70 |

FOREIGN PATENT DOCUMENTS

| | | | |
|---|---|---|---|
| CN | 1875298 | A | 12/2006 |
| CN | 101290364 | A | 10/2008 |
| JP | 2002072905 | A * | 3/2002 |
| WO | WO 2005050754 | A1 * | 6/2005 |
| WO | WO 2008018026 | A2 * | 2/2008 |

OTHER PUBLICATIONS

Serch Report—Office Action Chinese Patent Office dated Jul. 8, 2011.

* cited by examiner

*Primary Examiner* — Mariceli Santiago
(74) *Attorney, Agent, or Firm* — Chun-Ming Shih

(57) ABSTRACT

A method of fabricating a display panel comprises the steps of: forming a controlling elements array substrate and a flexible color filter, respectively; forming a displaying medium on the controlling elements array substrate; and assembling the flexible color filter to the controlling elements array substrate for disposing it on the displaying medium layer. A method of fabricating a flexible color filter comprises the steps of: forming a flexible substrate on a rigidly substrate; forming a color filter film comprising a plurality of color filter patterns; and separating the flexible substrate from the rigidly substrate. Since the color filter film are formed before separating the flexible substrate from the rigid substrate, the flexible color filter may have good resolution and process yield.

10 Claims, 6 Drawing Sheets

METHODS OF FABRICATING DISPLAY PANEL AND FLEXIBLE COLOR FILTER THEREOF

This application claims priority to a Taiwan application No. 098100781 filed Jan. 9, 2009.

BACKGROUND

1. Field of the Invention

The invention relates to a method of fabricating display panel, and more particularly, to a method of fabricating display panel with flexible color filter.

2. Description of the Related Art

With progress of the flat display technique, more and more electrical products, especially portable electrical products such as mobile phones, e-books, digital cameras and personal digital assistants etc., are equipped with flat display apparatuses. The development trend of the portable electrical product is to achieve light weight and thin thickness, so the flat display apparatus for the portable electrical product should have these features.

It is well known that the flexible panel display not only has features of light weight and thin thickness, but also has features of flexibility and is not easy to be broken. Therefore, the development of the flexible panel display has become increasingly important. During the fabricating process of conventional flexible panel display, a controlling elements array and a color filter film are printed on plastic substrates respectively by roll-to-roll printing process first. Then, the substrates are assembled to each other.

However, the yield and the capacity of the roll-to-roll printing process are limited since the steadiness thereof is not good enough. Furthermore, the resolution of the controlling elements or the color filter film formed by the roll-to-roll printing process only achieve to about 30 micrometer. It is not corresponding to the tendency toward request the resolution of the nowadays display panel to 1 micrometer.

Besides, since the controlling elements array or the color filter film are printed on the plastic substrates by ink jet printing during the conventional roll-to-roll printing process, the accuracy of process is more difficult to control than the accuracy of the lithographic and etching process. Moreover, the controlling elements array or the color filter film may be not even because the quantity of ink jetted by the clogged jet head is not uniform.

BRIEF SUMMARY

Therefore, the invention is directed to a method of fabricating flexible color filter for increasing the process yield thereof.

The invention is further directed to a method of fabricating of display panel for increasing the accuracy of aligning the flexible color filter and the controlling elements array substrate. Accordingly, the process yield of the display panel may be improved.

The invention provides a method of fabricating a flexible color filter. First, a rigid substrate is provided and a flexible substrate is formed on the rigid substrate. Next, a color filter film is formed on the flexible substrate. Then, the flexible substrate is separated from the rigid substrate.

The invention also provides a method of fabricating a display panel. First, a flexible color filter is formed by the aforementioned steps and a controlling elements array substrate with a display region and a peripheral circuit region is formed and a display medium is disposed within the display region. Next, the flexible color filter is assembled to above the controlling elements array substrate and on the display medium layer. Then, a driving circuit is disposed on the controlling elements array substrate and located in the peripheral circuit region.

According an embodiment of the invention, the step of separating the flexible substrate from the rigid substrate comprises a laser releasing process.

According an embodiment of the invention, a light-shielding layer with a plurality of openings is formed before forming the color filter film on the flexible substrate, wherein the color filter patterns are formed in the openings.

According an embodiment of the invention, a second rigid substrate is provided before forming the controlling elements array substrate, and then the controlling elements array substrate is formed on the rigid substrate. The controlling elements array substrate is separated from the second rigid substrate by, for example, a laser releasing process after disposing the driving circuit thereon.

According an embodiment of the invention, the color filter film may comprise red, green and blue color filter patterns. Moreover, according to another embodiment, the color filter film further comprise white color filter patterns.

According an embodiment of the invention, the material of the flexible substrate may be polyimide, polyethylene terephathalate, polyether ether ketone, or polyethylene naphthalene, PMMA, PS, PAR, PC, TAC, ARTON.

According an embodiment of the invention, the display medium layer may be an electro-phoretic layer, an electro-wetting layer or a cholesteric liquid crystal layer.

In the invention, since the color filter film are formed on the flexible substrate formed on the rigid substrate before separating the flexible substrate from the rigid substrate, the process yield and the capacity of the flexible color filter and the display panel with the same may be improved.

In order to make the aforementioned and other objects, features and advantages of the invention comprehensible, preferred embodiments accompanied with figures are described in detail below. It is to be understood that both the foregoing general description and the following detailed description are exemplary, and are intended to provide further explanation of this invention as claimed.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1A:
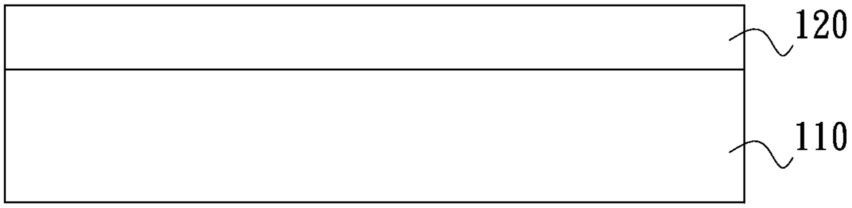
FIG. 1A to FIG. 1C are schematic cross-section views illustrating the flexible color filter during the fabricating process thereof according to an embodiment of the invention.
Figure 1B:
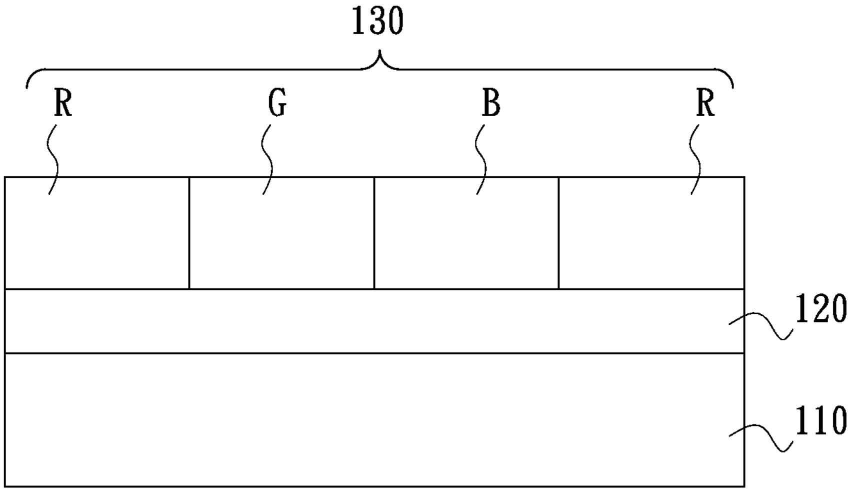
Figure 1C:
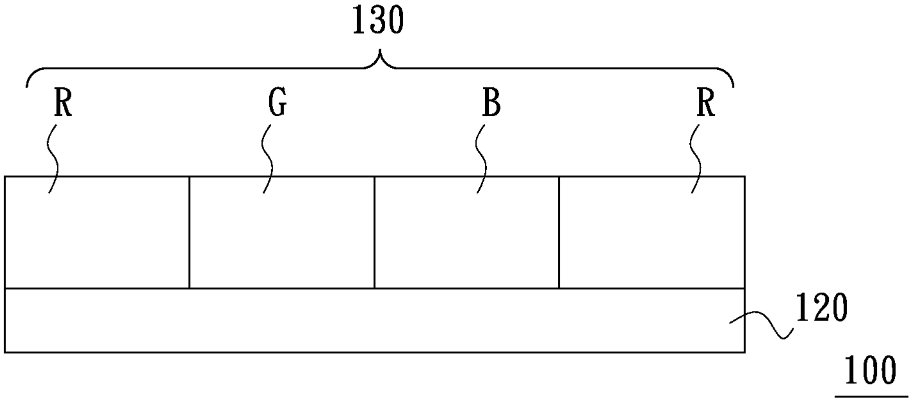

FIG. 1A to FIG. 1C are schematic cross-section views illustrating the flexible color filter during the fabricating process thereof according to an embodiment of the invention. Referring to FIG. 1A, a flexible substrate 120 is formed on a rigid substrate 110. The material of the rigid substrate 110 is, for example, glass or stainless steel and the material of the flexible substrate 120 may be polyimide, polyethylene terephathalate, polyether ether ketone, polyethylene naphthalene, polymethyl methacrylate, polystyrene, polyarylate, polycarbonate, TAC or ARTON.

Figure 2:
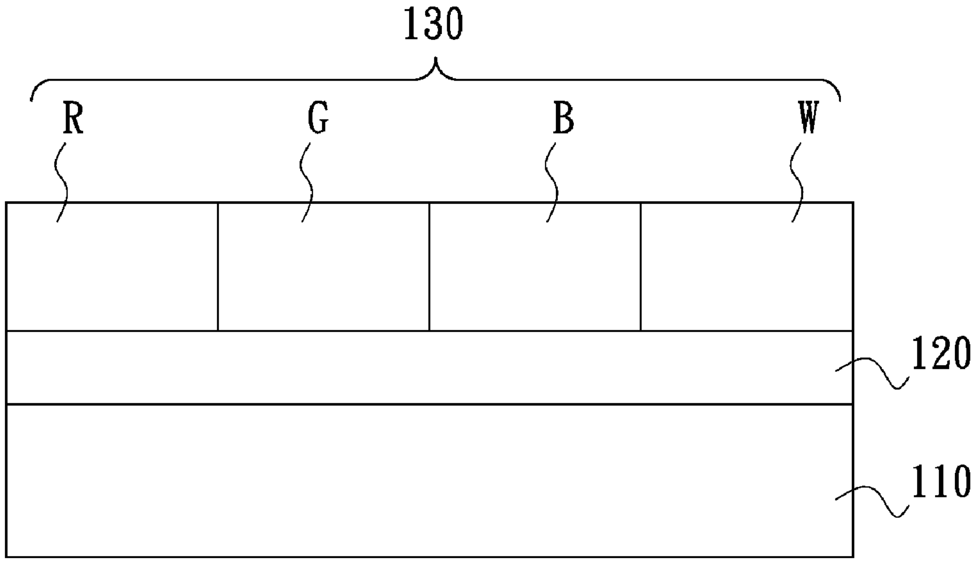
FIG. 2 is a schematic cross-section view illustrating the color filter film formed on the flexible substrate according to another embodiment of the invention.

Referring to FIG. 1B, a color filter film 130 is formed on the flexible substrate 120. In this embodiment, the color filter film 130 comprises a plurality of color filter patterns such as red color filter patterns R, green color filter patterns G and blue color filter patterns B. In the other embodiment, the color filter film 130 may also comprise white color filter patterns W for increasing the display brightness, as shown in FIG. 2. It should be noted that the color filter film 130 may be formed by lithographic and etching process. Furthermore, the color filter patterns may not only comprise cyan color filter patterns, yellow color filter patterns and magenta color filter patterns, also black color filter patterns. The colors of the color filter patterns of the invention are not limited hereto.

Figure 3:
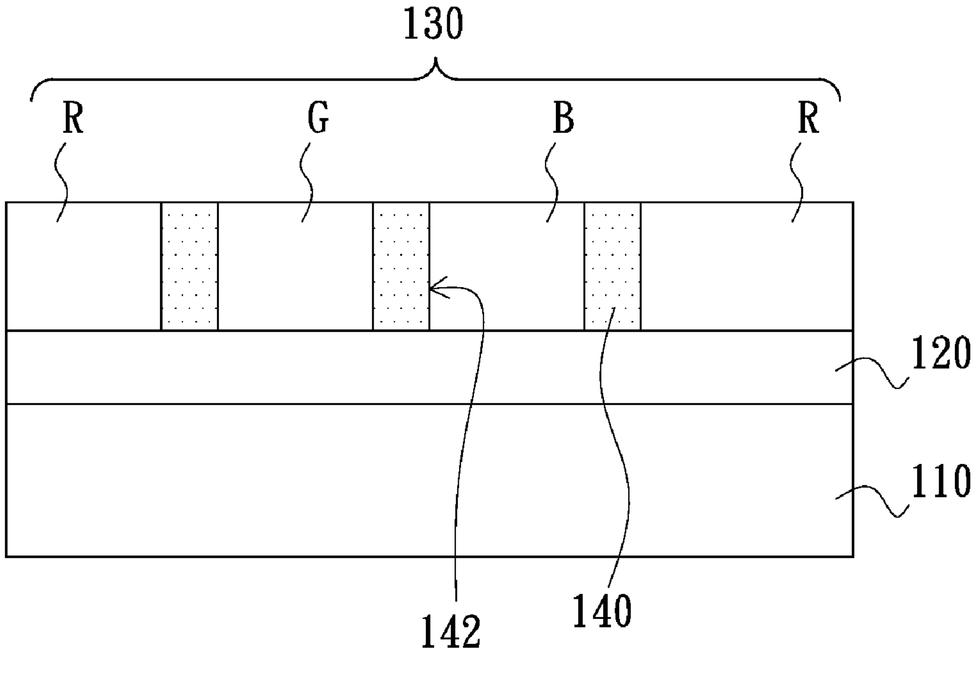
FIG. 3 is a schematic cross-section view illustrating the light-shielding layer and the color filter film formed on the flexible substrate according to another embodiment of the invention.

Moreover, a light-shielding layer 140 with a plurality of openings 142 may be formed on the flexible substrate 120 for improving the contrast of the display images and preventing the light from mixing before forming the color filter film 130 in another embodiment, as shown in FIG. 3. Then, the color filter patterns are formed in the openings 142 and the material of the light-shielding layer 140 is, for example, resin or the other opaque materials.

Referring to FIG. 1C, the flexible substrate 120 is separated from the rigid substrate 110 to form a flexible color filter 100. For example, the flexible substrate 120 is separated from the rigid substrate 110 by the laser releasing process.

Since the flexible substrate 120 is separated from the rigid substrate 110 after forming the color filter film 130 on the flexible substrate 120 by lithographic and etching process, the yield and capacity of the flexible color display medium module 100 may be improved substantially. The application of the flexible color filter 100 would be described in the follow-up paragraphs, but the invention is not limited hereto.

Figure 4A:
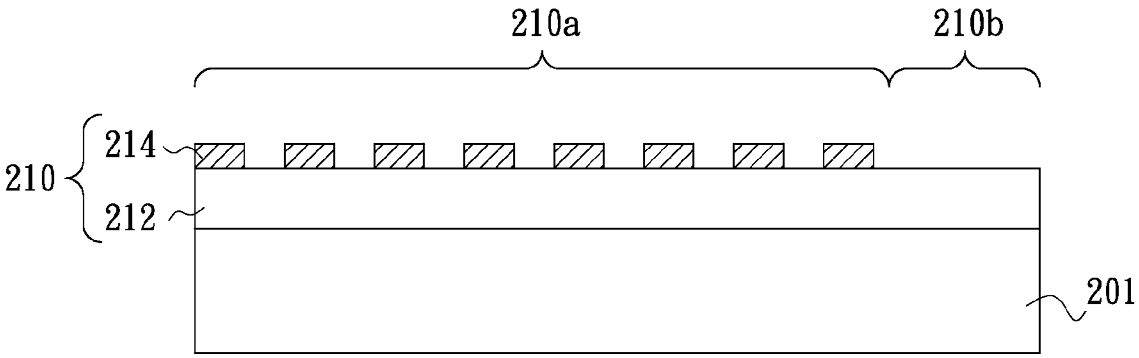
FIG. 4A to FIG. 4E are schematic cross-section views illustrating a display panel during the fabricating process thereof according to an embodiment of the invention.

FIG. 4A to FIG. 4E are schematic cross-section views illustrating a display panel during the fabricating process thereof according to an embodiment of the invention. Referring to FIG. 4A, a controlling elements array substrate 210 with a display region 210*a* and a peripheral circuit region 210*b* is formed first. In detail, the controlling elements array substrate 210 comprises a substrate 212 and a plurality of pixel units 214 formed thereon. The places where the pixel units 214 disposed is determined as the display region 210*a* of the controlling elements array substrate 210.

It is worth to say that the controlling elements array substrate 210 of this embodiment may be flexible. During the process of fabricating the flexible controlling elements array substrate 210, the substrate 212 with flexibility is formed on a rigid substrate 201 first. The material of the substrate 212 is similar to or the same with the material of the aforementioned flexible substrate 120, it is unnecessary to say herein. Then, the pixel units 214 are formed on the substrate 212. That is, the controlling elements array substrate 210 is formed on the rigid substrate 201 first in the invention.

Figure 5:
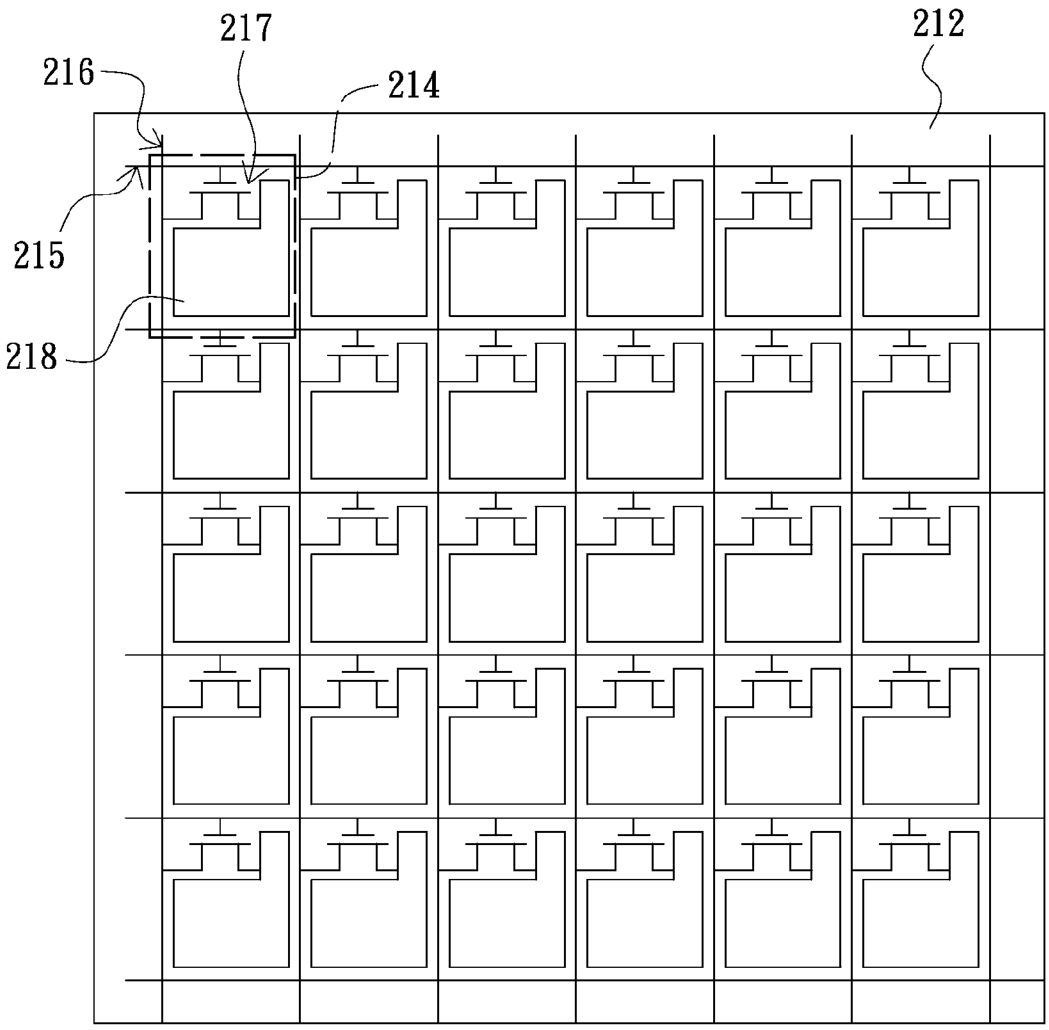
FIG. 5 is a schematic view illustrating a controlling elements array substrate according to an embodiment of the invention.

FIG. 5 is a schematic view illustrating a controlling elements array substrate according to an embodiment of the invention. Referring to FIG. 5, each pixel unit 214 comprises a scan line 215, a data line 216, a thin film transistor 217 and a pixel electrode 218. The thin film transistor 217 is electrically connected to the corresponding scan line 215 and the corresponding data line 216, each pixel electrode 218 is electrically connected to the data line 216 through the thin film transistor 217. That is, a thin film transistor array is used as controlling elements in this embodiment.

It should be noted that although the active controlling elements are used in this embodiment, the invention is not limited hereto. Those skilled in the art should know that the display panel of the invention also can be controlled by passive controlling elements array.

Figure 4B:
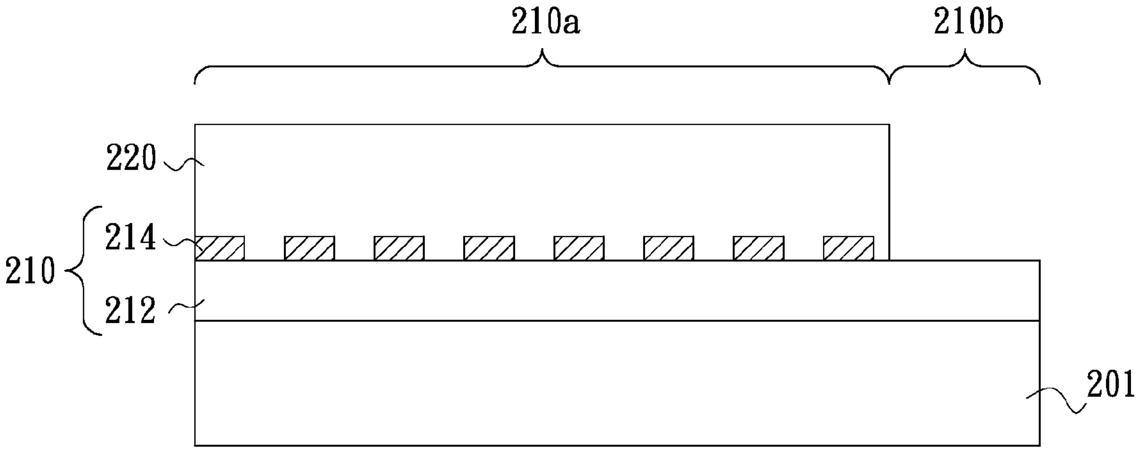

Referring to FIG. 4B, a display medium layer 220 is formed on the controlling elements array. In detail, the display medium layer 220 is disposed on the pixel units 214 located in the display region 210*a* of the controlling elements array substrate 210. In this embodiment, the display medium layer 220 is, for example, an electro-phoretic layer, an electro-wetting layer or a cholesteric liquid crystal layer.

Figure 4C:
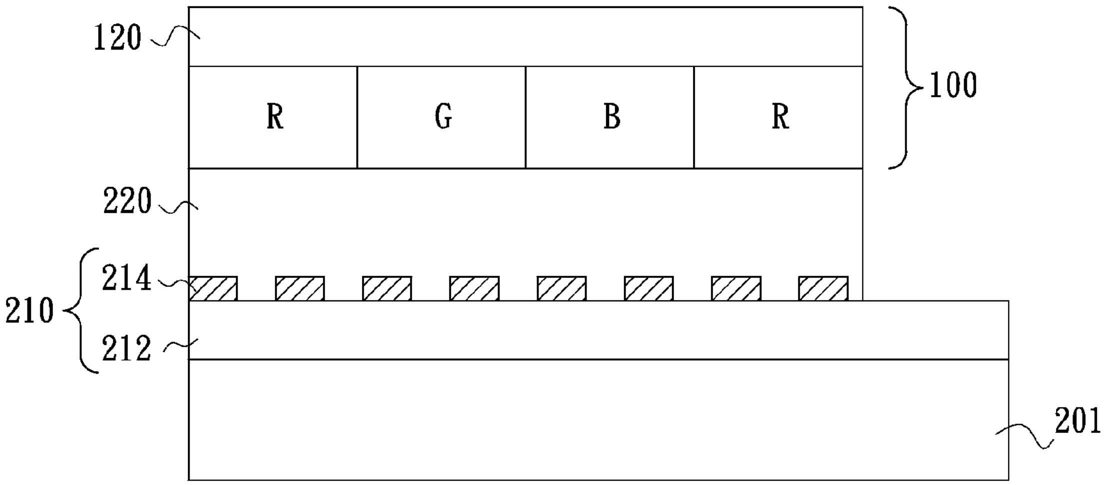

Referring to FIG. 4C, the flexible color filter 100 may be formed by the aforementioned steps. Then, the flexible color filter 100 and the controlling elements array substrate 210 are assembled to each other for locating the flexible color filter 100 on the display medium layer 220.

Figure 4D:
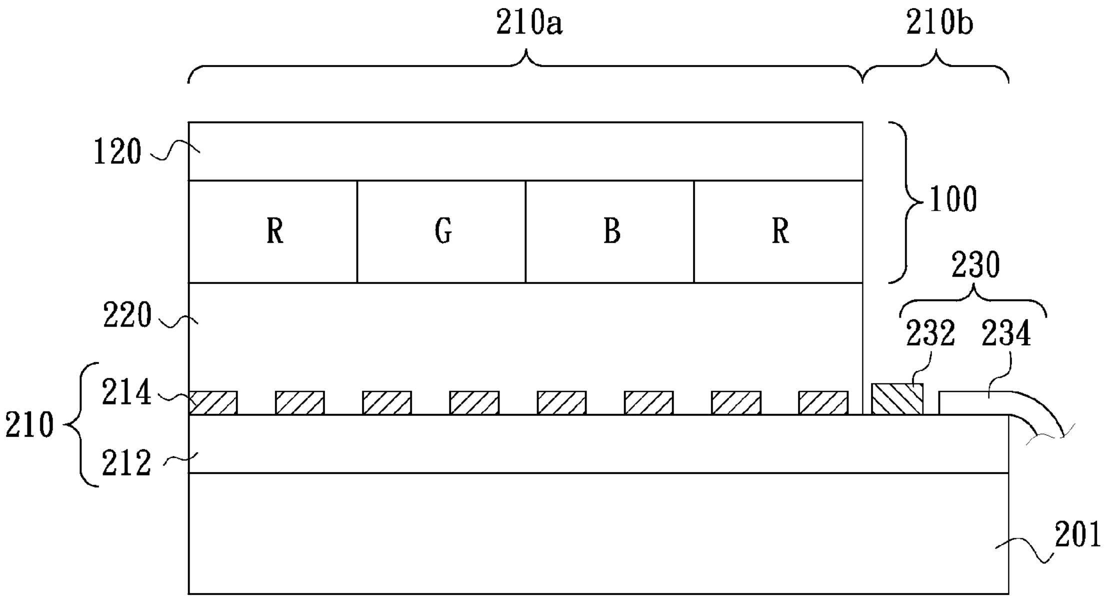

Referring to FIG. 4D, after assembling the flexible color display medium module 100 on the controlling elements array substrate 210, a driving circuit 230 is disposed in the peripheral circuit region 210*b* of the controlling elements array substrate 210. In detail, the driving circuit 230 comprises an IC circuit 232 and a flexible printed circuit 234. The IC circuit 232 is used for driving the pixel units 214 disposed in the peripheral circuit region 210*b* and the flexible printed circuit 234 is used for electrically connecting the IC circuit 232 to the external circuit (not shown in FIG. 4C). In this embodiment, the IC circuit 232 may disposed on the controlling elements array substrate 210 by chip on class process, chip on film process or tape automatic bonding process and electrically connected to the pixel units 214 disposed in the display region 210*a*.

Figure 4E:
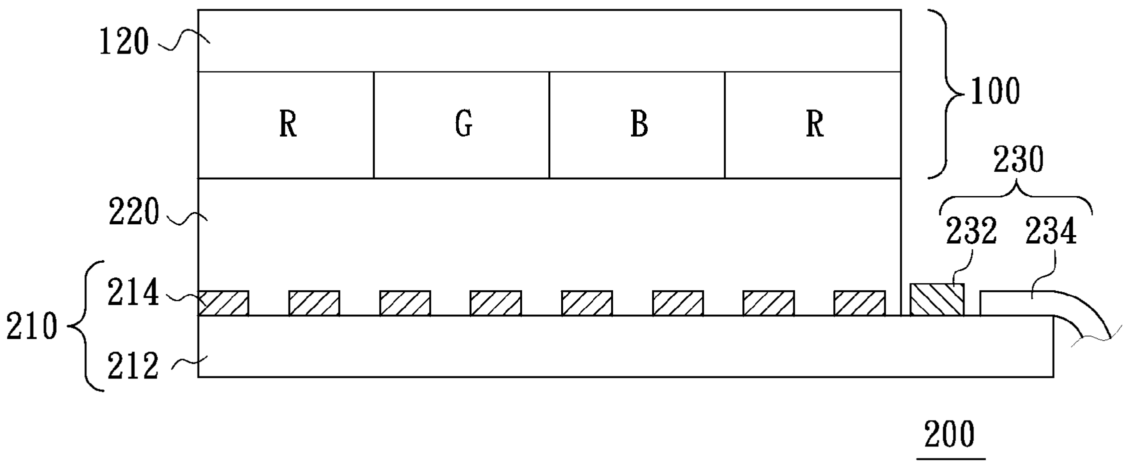

Specially, the controlling elements array substrate 210 is separated from the rigid substrate 201 after disposing the driving circuit 230 thereon to form the display panel 200 shown in FIG. 4E. In this embodiment, the substrate 212 may also separated from the rigid substrate 201 by a laser releasing process.

Since the flexible substrate is formed on the rigid substrate first, and then the color filter film are formed on the flexible substrate before separating the flexible substrate from the rigid substrate during the fabricating process of the flexible color filter of the invention, the flexible color filter of the invention comparing to the conventional color filter fabricated by roll-to-roll process has improved elements resolution, process yield and capacity.

Besides, the display panel of the invention may comprise the aforementioned flexible color display medium module and a flexible controlling elements array substrate. The controlling elements array substrate is formed on a rigid substrate first and separated therefrom after disposing the driving circuit on the flexible controlling elements array substrate. Accordingly, the pixel units of the invention may be formed by the multi-mask process to achieve the best resolution of 1 micrometer, and the flexible substrate may be prevented from deforming as disposing the driving circuit thereon. Therefore, the yield of the driving circuit may avoid decreasing.

In summary, the flexible color filter may be produced in mass production scale by the fabricating process of the invention. Moreover, the yield of the flexible color filter and the display panel with the same may be increased and the resolutions of the flexible color filter and the display panel may be improved.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of fabricating a display panel, comprising the steps of:
- forming a flexible color filter, comprising the steps of:
- providing a rigid substrate;
- forming a flexible substrate on the rigid substrate;
- forming a color filter film comprising a plurality of color filter patterns on the flexible substrate; and
- separating the flexible substrate from the rigid substrate;
- forming a controlling elements array substrate having a display region and a peripheral circuit region;
- forming a display medium layer within the display region of the controlling elements array substrate;
- assembling the flexible color filter to above the controlling elements array substrate, so as to make the color filter film directly in contact with the display medium layer; and
- disposing a driving circuit on the controlling elements array substrate and within the peripheral circuit region.

2. The method as recited as claim 1, wherein the step of separating the flexible substrate from the rigid substrate comprises a laser releasing process.

3. The method as recited as claim 1, further comprising the step of forming a light-shielding layer with a plurality of openings on the flexible substrate before forming the color filter film on the flexible substrate, and then the color filter patterns being formed in the openings.

4. The method as recited as claim 1, further comprising the steps of:
- providing a second rigid substrate before forming the controlling elements array substrate, and then the controlling elements array substrate being formed on the second rigid substrate; and
- separating the controlling elements array substrate from the second rigid substrate after disposing the driving circuit.

5. The method as recited as claim 4, wherein the step of separating the controlling elements array substrate from the second rigid substrate comprises a laser releasing process.

6. The method as recited as claim 1, wherein the color filter patterns comprise red color filter patterns, green color filter patterns and blue color filter patterns.

7. The method as recited as claim 6, wherein the color filter patterns further comprise white color filter patterns.

8. The method as recited as claim 1, wherein the color filter patterns comprise cyan color filter patterns, yellow color filter patterns and magenta color filter patterns.

9. The method as recited as claim 8, wherein the color filter patterns further comprise black color filter patterns.

10. The method as recited as claim 1, wherein the material of the flexible substrate is polyimide, polyethylene terephathalate, polyether ether ketone, polyethylene naphthalene, polymethyl methacrylate , polystyrene, polyarylate, polycarbonate, TAC or ARTON.

* * * * *